United States Patent [19]

Yalpani

[11] Patent Number: 5,268,422
[45] Date of Patent: Dec. 7, 1993

[54] FUNCTIONALIZED POLY(HYDROXYALKANOATES) AND METHODS OF MANUFACTURING SAME

[76] Inventor: Manssur Yalpani, 560 Leparc, Buffalo Grove, Ill. 60089

[21] Appl. No.: 973,730

[22] Filed: Nov. 9, 1992

Related U.S. Application Data

[62] Division of Ser. No. 554,338, Jul. 19, 1990, Pat. No. 5,191,016.

[51] Int. Cl.$^5$ .................. C08G 63/08; C08G 63/48; C08G 69/26; C08G 69/36
[52] U.S. Cl. .................. 525/54.2; 525/54.21; 525/54.24; 527/300; 528/295.5; 528/300; 528/308; 528/329.1; 528/335; 528/339.5; 528/345; 528/354; 528/361
[58] Field of Search ............. 525/54.2, 54.21, 54.24; 527/300; 528/295.5, 300, 308, 329.1, 335, 339.5, 345, 354, 361

[56] References Cited

U.S. PATENT DOCUMENTS

| | | |
|---|---|---|
| 3,645,939 | 2/1972 | Gaylord ............. 527/312 |
| 4,358,583 | 11/1982 | Walker et al. ............. 528/491 |
| 4,673,707 | 6/1987 | Tsai et al. ............. 525/54.2 |
| 4,786,598 | 11/1988 | Lafferty et al. ............. 435/146 |
| 4,876,331 | 10/1989 | Doi ............. 528/361 |

FOREIGN PATENT DOCUMENTS 046344  2/1982  European Pat. Off. .

OTHER PUBLICATIONS

McInerney et al "Synthesis and Function of Polyhydroxyalkanoates in Anaerobic Syntrophic Bacteria" Chemical Abstract 118(7) 55665f.
E. A. Dawes et al., "The Role and Regulation of Energy Reserve Polymers in Micro organisms", *Adv. Microb. Physiol.*, 10, pp. 135-266 (1973).
P. A. Holmes, "Developments in Crystalline Polymers-2", D. C. Basset, ed., *Elvesier Applied Science*, London, Chap. 1, pp. 1-65 (1988).
P. A. Holmes, "Applications of PHB-A Microbially Produced Biodegradable Thermoplastic," *Phys. Technol.*, 16, pp. 32-36 (1985).
Y. Doi et al., "Production of Copolyesters of 3-Hydroxybutyrate and 3-Hydroxyvalerate by *Alcaligenes eutrophus* from Butyric and Pentanoic Acids," *Appl. Microbiol. Biotechnol.*, 28, pp. 330-334 (1988).

(List continued on next page.)

*Primary Examiner*—Nathan M. Nutter
*Attorney, Agent, or Firm*—Marshall, O'Toole, Gerstein, Murray & Borun

[57] ABSTRACT

Functionalized poly(hydroxyalkanoate) derivatives having the general structural formula:

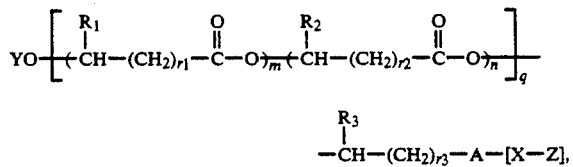

wherein Y is hydrogen, a saccharide moiety or an alkenyl moiety having a molecular weight in the range of from about 25 to about 100,000; $R_1$, $R_2$ and $R_3$ are, independently, hydrogen, an aromatic moiety, an alkyl moiety or an alkenyl moiety, said alkyl moiety or alkenyl moiety including from one to about nine carbon atoms; A is carbonyl or methylene; X is oxygen or imino (—NH); Z is selected from the group consisting of hydrogen, a saccharide moiety, an alkyl moiety and an alkenyl moiety having a molecular weight in the range of from about 25 to about 100,000, with the proviso that if Y is hydrogen, Z is not hydrogen; $r_1$, $r_2$ and $r_3$ are, independently, a numeral 1, 2 or 3; m and n are, independently, a numeral in the range of from one to about 5; and q is a numeral in the range of from about 5 to about 10,000, and a novel method of manufacturing the functionalized poly(hydroxyalkanoate) derivatives, are disclosed.

21 Claims, No Drawings

OTHER PUBLICATIONS

M. Kunioka et al., "Crystaline and Thermal Properties of Bacterial Copolyesters: Poly(3-Hydroxybutyrate-co-3-hydroxyvalerate) and Poly(3-Hydroxybutyrate-co-4-hydroxybutyrate(", *Macromolecules*, 22, pp. 694–697 (1989).

R. Gross et al., "Biosynthesis and Characterization of Poly($\beta$-Hydroxyalkanoates) Produced by *Pseudomona oleovorans*", *Macromolecules*, 22, pp. 1106–1115 (1989).

K. Fritzsche, "Production of Unsaturated Polyesters of *Pseudomonas olevorans*", *Int. J. Biol. Macromol.*, vol. 12, pp. 85–91 (1990).

R. Gross et al., "The Biosynthesis and Characterization of New Poly($\beta$-Hydroxyalkanolates)", *Polymer Preprints*, 30(1), pp. 492–493 (1989).

Trathnigg et al., "Niedermolekulares Poly($\beta$-hydroxybutyrate)", *Angew. Macromol. Chem.*, 161, pp. 1–8 (1988).

B. Heuttecoeur et al., *C. R. Hebd. Seances Acad. Sci.*, 274, pp. 2729–2732 (1972).

S. Akita et al., "Solution Properties of Poly(D-$\beta$-hydroxybutyrate).1.Biosynthesis and Characterization", *Macromolecules*, 9, pp. 774–780 (1976).

S. Coulombe et al., "High Pressure Liquid Chromatography for Functionating Oligomers from Degraded Poly($\beta$-Hydroxybutrate)", *Macromolecules*, 11, pp. 279–280 (1978).

A. Ballistreri et al., "Sequencing Bacterial Poly($\beta$-Hydroxybutyrate-co-$\beta$-hydroxyvalerate) by Partial Methanolysis, High-Performance Liquid Chromatography and Fast Atom Bombardment Mass Spectrometry Analysis", *Macromolecules*, 22, pp. 2707–2111 (1989).

H. Morikawa et al., "Pyrolysis of Bacterial Polyalkanoates", *Can. J. Chem.*, 59, pp. 2306–2313 (1981).

N. Grassie et al., "The Thermal Degradation of Poly(-(D)-$\beta$-Hydroxybutyric Acid): Part 1-Identification and Quantitative Analysis of Products", *Polym. Degrad. Stabil.*, 6, pp. 47–61 (1984).

M. Kunioka et al., "Thermal Degradation of Microbial Polyesters: Poly(3-hydroxybutyrate-co-3-hydroxyvalerate) and Poly(3-hydroxybutyrate-co-4-hydroxybutyrate)", *Macromolecules*, 23(7), pp. 1933–1936 (1990).

P. B. Dave et al., "Survey of Polymer Blends Containing Poly(3-Hydroxybutyrate-co-16% Hydroxyvalerate", *Polymer Preprints*, 31(1), pp. 442–443 (1990).

R. I. Hollingsworth et al., "Identification of 3-Hydroxybutanoic Acid as a Component of the Acidic Extracellular Polysaccharide of *Rhizobium trifolii* 0403", *Carbohydrate Research*, 134, pp. C7–C11 (1984).

R. I. Hollingsworth et al., "Reexamination of the Presence and Linkage of 3-Hydroxybutyryl Substituents in the Acidic Capsular Polysaccharide of *Rhizobium trifolii* 0403", *Journal of Bacteriology*, 169(7), pp. 3369–3371.

M. S. Reeve et al., "The Chemical Degradation of Bacterial Polyesters for Use in the Preparation of New Degradable Block Copolymers", *Polymer Preprints*, 31(1), pp. 437–438 (1990).

FUNCTIONALIZED POLY(HYDROXYALKANOATES) AND METHODS OF MANUFACTURING SAME

CROSS-REFERENCE TO RELATED APPLICATIONS

This is a divisional of U.S. application Ser. No. 07/554,338, filed Jul. 19, 1990, and now U.S. Pat. No. 5,191,016.

FIELD OF THE INVENTION

The present invention relates to a novel class of biodegradable polymers and to an improved method of manufacturing the biodegradable polymers. More particularly, the present invention is directed to biodegradable, functionalized poly(hydroxyalkanoate) derivatives that demonstrate improved physical properties, such as improved water dispersiblity for ease of processing, and improved thermal stability; and that demonstrate an ability to form biodegradable films for use in a variety of consumer, industrial and agricultural applications. The present invention also is directed to a novel method of preparing the biodegradable poly(hydroxyalkanoate) derivatives. The present invention is directed particularly to a biodegradable polymer comprising a poly(hydroxyalkanoate), like poly(3-hydroxybutyrate), functionalized at its hydroxy-terminated end, its carboxy-terminated end or at both its hydroxy-terminated and carboxy-terminated ends with a moiety other than a poly(hydroxyalkanoate), such as a saccharide, like chitosan.

BACKGROUND OF THE INVENTION

Poly(hydroxyalkanoates) (PHAs) are well-known polyester compounds produced by a variety of microorganisms, such as bacteria and algae. A PHA polyester can include the same or different repeating units, depending upon the choice of carbon source substrates and fermentation conditions employed in the production of the PHA. One particular PHA including the same repeating units is poly(3-hydroxybutyric acid), or poly(3-hydroxybutyrate), termed PHB, and having the structural formula:

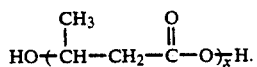

PHB is a natural storage product of bacteria and algae, and is present as discrete granules within the cell cytoplasmic space. However, unlike other biologically-synthesized polymers such as proteins and polysaccharides, PHB is thermoplastic having a high degree of crystallinity and a well-defined melting point at about 180° C. But, PHB is unstable at its melting point and degrades, essentially quantitatively, to crotonic acid at a temperature slightly above its melting point. Accordingly, practical applications for this natural, biodegradable polyester have been limited. Therefore, investigators have studied other PHAs, such as the biodegradable copolyester poly(hydroxybutyrate-co-valerate), including both of the monomeric units 3-hydroxybutyrate and 3-hydroxyvalerate, in order to discover a PHA having sufficient thermal stability and other suitable chemical and physical properties for use in practical applications.

Generally, a PHA is synthesized by a microorganism. However, some PHA compounds have been synthesized chemically, such as by polymerization of racemic and optically-active butyrolactone or other suitable monomers. Such chemically-synthesized PHA polyesters exhibited a relatively low average molecular weight, and the synthesis was not economically viable. In general, the following publications provide background information for PHA polymers, both in regard to their synthesis and their properties:

1) E. A. Dawes, et al., *Adv. Microb. Physiol.*, 10, p. 135 (1973);

2) P. A. Holmes, "Developments in Crystalline Polymers-2", D. C. Basset, ed., *Elsevier Applied Science*, London, Chap. 1, pp. 1-65 (1988); and 3) P. A. Holmes, *Phys Technol.*, 16, pp 32-36 (1985).

The preparation, extraction and purification, of a PHA by a biosynthetic process is known. For example, Richardson in European Patent Application Serial No. 046,344, and Lafferty et al. in U.S. Pat. No. 4,786,598, disclose the preparation of poly-D-(−)-3-hydroxybutyric acid (PHB) by culturing the microorganism *Alcaligenes latus* or a mutant thereof. Walker et al., in U.S. Pat. No. 4,358,583, teach the extraction and purification of poly(3-hydroxybutyric acid) from the cell walls of PHB-producing microorganisms. Furthermore, the bacterial synthesis of various co-poly(hydroxyalkanoates), such as the copolymer of 3-hydroxybutyric acid and 3-hydroxypentanoic acid, is described in publications such as:

Y. Doi, et al., "Production of Copolyesters of 3-Hydroxybutyrate and 3-Hydroxyvalerate by *Alcaligenes eutrophus* from Butyric and Pentanoic Acids", *Appl. Microbiol. Biotechnol.*, 28, pp. 330-334 (1988);

Doi, U.S. Pat. No. 4,876,331;

P. Holmes, *Phys. Technol.*, 16, pp. 32-36 (1985);

M. Kunioka,-et al., "Crystalline and Thermal Properties of Bacterial Copolyesters: Poly(3-Hydroxybutyrate-co-3-hydroxyvalerate) and Poly(3-Hydroxybutyrate-co-4-hydroxybutyrate)", *Macromolecules*, 22, pp. 694-697 (1989); and R. Gross, et al., "Biosynthesis and Characterization of Poly(β-Hydroxyalkanoates) Produced by *Pseudomonas oleovorans*", *Macromolecules*, 22, pp. 1106-1115 (1989).

The above-listed patents and publications are representative of the state of the art relating to PHAs. In general, the homopolymeric and copolymeric PHAs described in the above references are attempts to improve the physical and chemical properties of the PHA by altering the carbon source for the biological synthesis of the PHA, or are attempts to find a suitable microorganism to produce a sufficient amount of the desired PHA. In general, a poly(hydroxyalkanoate) has the general structural formula (I), wherein R is hydrogen or an alkyl group, and the term "a" is the number of repeating units. As illustrated in general structural formula (I), a PHA is a polyester having a hydroxy-terminated end and a carboxy-terminated end. The most widely-known and intensively-studied

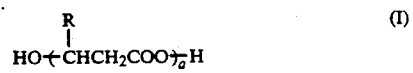

poly(hydroxyalkanoate) is the previously-described, biodegradable PHA known as poly(hydroxybutyrate), or PHB, wherein the R substitutent in general structural formula (I) is methyl. However, PHAs having an R substituent of up to nine carbon atoms have been biosynthesized and studied, as have PHAs including 4-hydroxybutyrate [(—$CH_2CH_2CH_2CO_2$—)$_n$] as a repeating unit.

In addition, copolymers of general structural formula (II) have been biosynthesized by the appropriate choice of carbon substrates. For example, the copolymer of general structural formula (II), wherein

$R_4$ is methyl and $R_5$ is ethyl, known as poly(hydroxybutyrate-co-valerate) or (P[HBcoHV]), has been biosynthesized and studied. In general, the copolyesters of general structural formula (II) wherein the substituents $R_4$ and $R_5$, independently, are hydrogen or an alkyl or alkenyl group including up to nine carbon atoms are known. Alkenyl-branched PHA's are described by K. Fritzsche, in "Production of Unsaturated Polyesters by *Pseudomonas oleovorans*", *Int. J. Biol. Macromol.*, Vol. 12, pp. 85-91 (1990). In addition, a terpolymer of structural formula (III) has been biosynthesized by the bacterium *Rhodospirillum rubrum* from a carbon source including 3-hydroxybutyric acid, 3-hydroxypentanoic acid and 4-pentenoic acid.

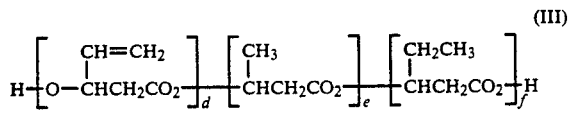

This terpolymer is described by R. Gross et al. in the publication, "The Biosynthesis and Characterization of New Poly(β-Hydroxyalkanoates)", in *Polymer Preprints*, 30(1), pp. 492-493 (1989).

The biologically-synthesized PHAs exhibit a molecular weight of up to about 1,500,000 daltons. These high molecular weight, biologically-synthesized PHAs can be degraded, or depolymerized, to yield a PHA having a molecular weight as low as about 3000 daltons. For example, Trathnigg et al., in *Angew. Macromol. Chem.*, 161, p. 1-8 (1988), described the preparation of a low molecular weight PHB by a controlled acid hydrolysis of a high molecular weight, biologically-synthesized PHB using aqueous formic, acetic or butyric acid at an elevated temperature of 90°-100° C. Similarly, B. Heuttecoeur, et al., in *C. R. Hebd. Seances Acad. Sci.*, 274, pp. 2729-2732, (1972), describe the partial alkaline degradation of PHB, and S. Akita, et al., in *Macromolecules*, 9, pp. 774-780 (1976), describe the alcoholysis of PHB with methanol and p-toluenesulfonic acid. The methods of Trathnigg and of Heuttecoeur provide a degraded PHB polymer with a carboxylic acid or a carboxylate terminal group, whereas the method of Akita provides an ester terminal group. Also see S. Coulombe, et al., "High-Pressure Liquid Chromatography for Fractionating Oligomers from Degraded Poly(β-Hydroxybutyrate)", *Macromolecules*, 11, pp. 279-280 (1978); and A. Ballistreri, et al., "Sequencing Bacterial Poly(β-Hydroxybutyrate-co-8-hydroxyvalerate) by Partial Methanolysis, High-Performance Liquid Chromatography Fractionation and Fast Atom Bombardment Mass Spectrometry Analysis", Macromolecules, 22, pp. 2107-2111 (1989).

H. Morikawa et al. in *Can. J. Chem.*, 59, pp. 2306-2313, (1981) demonstrated that thermal degradation of a PHA copolyester yields monomeric, oligomeric and polymeric PHAs with olefinic terminal groups. Morikawa et al. pyrolyzed PHB to yield crotonic acid and oligomers of PHB having a terminal crotonate moiety, as shown in the polyester of structural formula (IV). Therefore, pyrolysis of a PHA can provide an

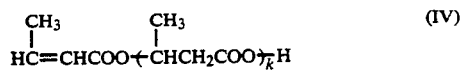

oligomer with a reactive vinyl terminal group as a site for further chemical modification of the degraded PHA.

Accordingly, from the above degradation methods, i.e. acidic hydrolysis, alkaline hydrolysis, alcoholysis or pyrolysis, a high molecular weight, biologically-synthesized PHA can be degraded to a relatively low molecular weight PHA that includes one of a variety of reactive terminal functionalities, including hydroxyl, free carboxylic acid, carboxylate, ester, and olefinic functionalities. These reactive terminal functionalities therefore allow the introduction of numerous other types of terminal functionalities onto the degraded PHA polyester.

In the past, interest in PHAs concentrated on their unique biodegradable and biocompatible properties, as well as their various physical properties that range from thermoplastic to elastomeric. The physical and chemical properties inherent to PHAs suggest a variety of applications, such as in controlled drug release systems, biomedical devices, specialty packaging materials, and numerous agricultural applications. However, while PHAs are of general interest because of their biodegradable nature, their actual use as a plastic material has been hampered by their thermal instability. For example, poly-3-hydroxybutyrate is thermoplastic, but also is thermally unstable at temperatures exceeding its melting point of about 180° C. N. Grassie, et al., in *Polym. Degrad. Stabil.*, 6, pp. 47-61 (1984), disclose that a substantial molecular weight reduction of PHB occurs by heating PHB in the temperature range of 180°-200° C. The inherent thermal instability of PHB is partially overcome by incorporating a second monomer unit into the polyester. The melting point of a PHB can, for instance, be reduced to 75° C., as in (P[HBcoHV]) including about 40 mol % 3-hydroxyvalerate, resulting in a polymer that is thermally stable up to about 160° C. However, further enhancements in the thermal stability of PHAs are necessary for their practical use in commercial applications. Also see M. Kunioka, et al., *Macromolecules*, 23, pp. 1933-1936 (1990).

Accordingly, prior investigators have studied the chemical and biological synthesis of PHAs, and the degradation of PHAs, in attempts to provide a biodegradable polymer having physical and chemical properties suitable for consumer, industrial and agricultural applications. However, the prior investigators have studied essentially only homopolymeric and copolymeric hydroxyalkanoates. In general, to date, very few known references are directed to a compound, or its method of preparation, including a PHA polymer functionalized with a moiety other than a poly(hydroxyalkanoate).

Some investigators, like P. B. Dave et al., in "Survey of Polymer Blends Containing Poly(3-Hydroxybutyrate-co-16% Hydroxyvalerate", in *Polymer Preprints*, 31(1), pp. 442–443 (1990), studied the physical compatibility of a PHA blended with other commercial polymers. However, these were physical blends of a PHA with a second polymer, like a poly(ethylene oxide), and did not include a PHA polymer covalently attached to a molecule or a polymer other than a PHA. R. I. Hollingsworth et al. in *Carbohydrate Research*, 134, pp. C7-C11 (1984) and R. I. Hollingsworth et al. in *Journal of Bacteriology*, 169(7), pp. 3369–3371 (1987) found 3-hydroxybutyrate covalently attached as a noncarbohydrate substituent in the acidic capsular polysaccharide and extracellular polysaccharide of *Rhizobium trifolii*. However, the 3-hydroxybutyrate substituent was monomeric and was substituted biologically, not chemically. M. S. Reeve et al., in "The Chemical Degradation of Bacterial Polyesters for Use in the Preparation of New Degradable Block Copolymers", *Polymer Preprints*, 31(1), pp. 437–438 (1990), disclose a polyurethane-type copolymer derived from the reaction of 4,4'-diphenylmethane diisocyanate with polyethylene glycol and degraded PHB, and disclose a PHB-polystyrene block copolymer derived from degraded PHB and a polystyrene prepolymer including a carboxylic acid functionality.

However, no known prior art reference teaches or suggests a compound including a degraded PHA covalently attached to a polysaccharide or to a carbohydrate to provide a novel class of polymers having improved physical properties. The physical properties demonstrated by the novel, biodegradable polymers of the present invention, such as improved solubility in an aqueous solvent and improved thermal stability, are unique and useful, and are distinguished and improved over the physical properties of both the PHA polyester itself and the non-PHA moiety, or moieties, covalently attached to the PHA polyester. Furthermore, the novel poly(hydroxyalkanoate) derivatives can be designed to possess physical properties intermediate between the physical properties of the individual PHA and non-PHA components of the functionalized poly(hydroxyalkanoate) derivative.

SUMMARY OF THE INVENTION

In brief, the present invention is directed to a novel class of biodegradable polymers, including a PHA functionalized at either its hydroxy-terminated end, its carboxy-terminated end or at both ends with a moiety other than a PHA. The present invention also is directed to a method of manufacturing these novel biodegradable polymers. The novel polymers of the present invention exhibit an improved thermal stability and exhibit improved physical properties to allow more facile processing of the biodegradable polymer.

More particularly, the present invention is directed to biodegradable, functionalized poly(hydroxyalkanoate) derivatives having the general structural formula (V):

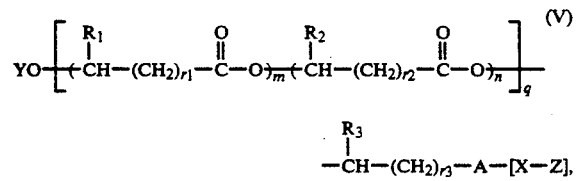

wherein Y is hydrogen, a saccharide moiety or an alkenyl moiety having a molecular weight in the range of from about 25 to about 100,000; $R_1$, $R_2$ and $R_3$ are, independently, hydrogen, an aromatic moiety, an alkyl moiety or an alkenyl moiety, said alkyl moiety or alkenyl moiety including from one to about nine carbon atoms; A is carbonyl or methylene; X is oxygen or NH; Z is selected from the group consisting of hydrogen, a saccharide moiety, an alkyl moiety and an alkenyl moiety having a molecular weight in the range of from about 25 to about 100,000, with the provision that if Y is hydrogen, Z is not hydrogen; $r_1$, $r_2$ and $r_3$ are, independently, a numeral 1, 2 or 3; m and n are, independently, a numeral in the range of from one to about 5; and q is a numeral in the range of from about 5 to about 10,000. The present invention also is directed to a novel method of manufacturing the functionalized poly(hydroxyalkanoate) derivatives. In particular, the present invention is directed to a poly(hydroxyalkanoate) functionalized with a saccharide, like chitosan, or a carbohydrate.

The advantages and novel features of the present invention will become apparent from the following detailed description of the invention illustrating the functionalized poly(hydroxyalkanoate) derivatives and their method of manufacture.

DETAILED DESCRIPTION OF THE INVENTION

The present invention is directed to biodegradable, functionalized poly(hydroxyalkanoate) derivatives having the general structural formula (V):

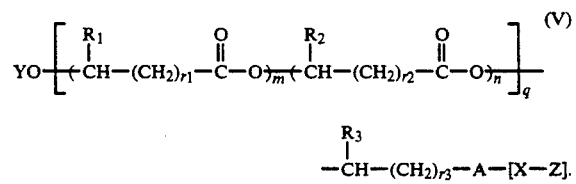

In the poly(hydroxyalkanoate) derivative of structural formula (V), $R_1$, $R_2$ and $R_3$ are, independently, hydrogen; an aryl moiety, either carbocyclic or heterocyclic; an alkyl moiety; or an alkenyl moiety, wherein the alkyl moiety or the alkenyl moiety includes from one to about nine carbon atoms. For example, in the case of a simple, homopolymeric beta-D-polyhydroxyalkanoate, $R_1$, $R_2$ and $R_3$ are the same; if the beta-D-polyhydroxyalkanoate portion of the polymer is a copolyester, $R_1$, $R_2$ and $R_3$ can be different. Examples of the $R_1$, $R_2$ and $R_3$ substituents include, but are not limited to, hydrogen, methyl, ethyl, propyl, vinyl, phenyl, pyridinyl, and similar alkyl, alkenyl and aryl moieties. It also is envisioned that in addition to functionalizing the hydroxy-terminated end or carboxy-terminated end of the PHA, that if $R_1$, $R_2$ or $R_3$ is an alkenyl moiety, then $R_1$, $R_2$ or $R_3$ can be functionalized with a compound capable of interacting with a carbon-carbon double bond, such as, but not limited to, vinyl chloride, vinylidene chloride, styrene, acrylic acid, acrylonitrile, acrylates, methacrylates, acrylamide, maleic anhydride, methacrylic acid, vinyl acetate, and an alkenyl compound.

In accordance with another important feature of the present invention, $r_1$, $r_2$ and $r_3$, independently, are numerals in the range of from one to three. Again, in the case of a simple, homopolymeric beta-D-polyhydroxyalkanoate, $r_1$, $r_2$ and $r_3$ are the same. For example, in PHB, $r_1$, $r_2$ and $r_3$ each are one and $R_1$, $R_2$ and $R_3$ each are methyl. If the beta-D-polyhydroxyalkanoate portion of the polymer is a copolyester, $r_1$, $r_2$ and $r_3$ can be different.

The numerals m and n are, independently, in the range of from one to five, and represent the relative molar proportions of the respective repeating units if the PHA portion of the compound comprises a copolyester. If the PHA portion of the compound is a simple, homopolymeric beta-D-polyhydroxyalkanoate, m and n are equal. The numeral q is related to the molecular weight of the PHA portion of the molecule, and is a numeral in the range of from about 5 to about 10,000, and preferably in the range of from about 5 to about 1,000. To achieve the full advantage of the present invention, the term q is a numeral in the range of from about 10 to about 150. In general, a numeral q in the range of from about 5 to about 10,000 correlates to a molecular weight of the PHA portion of the compound in the range of from about 425 daltons to about 5,000,000 daltons. A numeral q in the range of from about 10 to about 150 correlates to a molecular weight of the PHA portion of the compound in the range of about 850 daltons to about 75,000 daltons.

Therefore, a biodegradable poly(hydroxyalkanoate) derivative depicted in general structural formula (V) includes a PHA polyester functionalized at either its hydroxy-terminated end (Y—O—) or its carboxy-terminated end (—A—[X—Z]), or at both ends, with a moiety other than a PHA. The PHA portion of the polymer can include any biologically or chemically-produced PHA, either a homopolymer or a copolymer. As will be demonstrated more fully hereinafter, the poly(hydroxyalkanoate) of general structural formula (V) includes a degraded fraction of a naturally-occurring or chemically-produced PHA. However, the functionalized poly(hydroxyalkanoate) derivative of general structural formula (V) can be produced directly from a high molecular weight, nondegraded PHA polyester without a separate hydrolysis or pyrolysis step to degrade the PHA and without isolating the degraded PHA.

In an abbreviated form, the functionalized poly(hydroxyalkanoate) derivative of general structural formula (V) can be represented by general structural formula (VI):

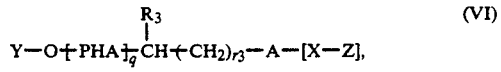

wherein the term "PHA" is the polyhydroxyalkanoate portion of the compound and includes the numeral q of total repeating units including the m and n repeating units defined above.

As stated above, the biodegradable poly(hydroxyalkanoate) derivatives of the present invention comprise a PHA functionalized at one, or both, of its molecular ends with a moiety other than a PHA. For example, if the hydroxy-terminated end of the PHA is not functionalized, then the term Y is hydrogen. However, it nevertheless is possible to functionalize the carboxy-terminated end of the molecule, depicted by —A—[X—Z] in general structural formula VI. For example, the carboxy-terminated end can be functionalized with an ester linkage if A is carbonyl, X is oxygen, and Z is an alcohol residue. Similarly, the carboxy-terminated end can be functionalized with an amide linkage if A is carbonyl, X is NH and Z is an amine residue; or functionalized with an amine linkage if A is methylene, X is NH and Z is the amine residue.

Furthermore, if the carboxy-terminated end of the PHA is not functionalized, then the term A is carbonyl, X is oxygen and Z is hydrogen. Then, the hydroxy-terminated end of the PHA can be functionalized with a Y functionality, such as a saccharide moiety or an alkenyl moiety having a molecular weight in the range of from about 25 to about 100,000. Alternatively, both the hydroxy-terminated and the carboxy-terminated ends of the PHA can be functionalized.

As will be demonstrated more fully hereinafter, preferably, the carboxy-terminated end of the PHA is functionalized with a carbohydrate, and the hydroxy-terminated end of the PHA either is either functionalized or is unmodified. As stated above, if the carboxy-terminated end is functionalized and if Y is hydrogen, the hydroxy-terminated end is unmodified. However, to provide a poly(hydroxyalkanoate) derivative of the present invention that possesses the desired physical properties or that possesses a chemically-reactive functionality for further modifications, Y can be an alkenyl moiety having a molecular weight in the range of from about 25 to about 100,000, or Y can be a carbohydrate moiety. Therefore, the PHA portion of the poly(hydroxyalkanoate) derivative can be functionalized at the hydroxy-terminated end (Y) or the carboxy-terminated end (A—[X—Z]), or both ends, with a moiety other than a PHA to provide a functionalized PHA derivative having suitable chemical and physical properties for use in consumer, industrial and agricultural applications.

PREFERRED EMBODIMENTS OF THE PRESENT INVENTION

A PHA polyester utilized to provide a functionalized poly(hydroxyalkanoate) derivative of the present invention preferably has a molecular weight in the range of from about 425 to about 500,000 daltons, and to achieve full advantage of the present invention in the range of from about 1,000 to about 75,000 daltons. The specific molecular weight of the PHA that then is functionalized is related to the desired physical and chemical properties of the final functionalized poly(hydroxyalkanoate) derivative. PHAs having a molecular weight in the desired range of from about 425 daltons to about 500,000 daltons can be produced by several methods, including acid or alkaline hydrolysis, alcoholysis and thermal degradation. Surprisingly, it has been found that a controlled depolymerization of the PHA can be performed either as a separate process step to provide a PHA material of the desired molecular weight; or, preferably, can be performed simultaneously with the functionalization of the PHA. It should be noted, however, that the particular depolymerization technique used to degrade, or depolymerize, the PHA may be dictated by whether the hydroxy-terminated end, the carboxy-terminated end or both ends of the PHA is to be functionalized.

For example, in a controlled acid hydrolysis, the PHA polyester first is added to an aqueous acid solution, such as an acetic acid, butyric acid, or propionic acid solution including about 85% by weight of the acid. Then the PHA-acid mixture is heated to a temperature of from about 75° C. to about 100° C., wherein the final concentration of the nondegraded PHA polyester in the acid solution can reach 30 g/L (grams/liter). When the desired level of depolymerization, or degradation, is achieved, the degraded PHA polyester is precipitated from the PHA-acid mixture by adding the PHA-acid mixture to a non-solvent for PHA, such as water, followed by filtering, washing and drying the degraded PHA polyester. The rate and degree of PHA depolymerization is controlled by the temperature level and by the length of time the PHA is heated, to yield a degraded PHA having a molecular weight in the range of from about 425 to about 500,000 daltons and an $M_w/M_n$ ratio of from 1.60 to 2.70, wherein the term $M_w$ is weight average molecular weight and the term $M_n$ is number average molecular weight.

In a preferred method of manufacturing a PHA derivative of the present invention, the controlled depolymerization of the PHA is performed without isolating the degraded PHA. In this method, the PHA polyester first is dispersed, at either ambient temperature or an elevated temperature of from about 50° C. to about 100° C., in acetic acid or other suitable organic acid; or is dissolved in a mixture of 1 part by weight of a suitable acid and from one part to about 80 parts of a suitable organic solvent, such as dimethylsulfoxide (DMSO), methylene chloride, dimethylformamide, chloroform, ethylene dichloride or similar organic solvent. Preferably, the weight ratio of parts of acid to parts of organic solvent is in the range of about 1:10 to about 1:65. When the desired degree of depolymerization is achieved, the resulting degraded PHA then is functionalized without isolating the PHA, as detailed below. To achieve the full advantage of the present invention, the PHA is degraded in the presence of the functionalizing compound to simultaneously degrade and functionalize the PHA.

If the desired functionalization of the degraded PHA requires, for example, a terminal carboxy-terminated end, the above acid hydrolysis can be employed in order to provide an amide-, amine-, or ester-linked PHA derivative. A thermal degradation, performed by heating a nondegraded PHA polyester to about 150° C. under inert atmosphere for a sufficient time period, is preferred when a reactive alkenyl-terminated end is needed on the PHA for the functionalization process, e.g., in a polymerization or copolymerization reaction between the degraded PHA and the functionalizing moiety.

The preparation of amide-linked functionalized poly(hydroxyalkanoate) derivative is accomplished by dissolving the degraded PHA, or by degrading the PHA, in a suitable solvent or solvent mixture as described above, then interacting the degraded PHA with an amine or polyamine, in a molar equivalent ratio of degraded PHA to amine or polyamine of about 0.1:1 to about 10:1, at ambient temperature or at an elevated temperature of from about 50° C. to about 120° C. for a time period of from about 2 hours to about 200 hours. This interaction optionally can be performed under an inert atmosphere or at an elevated pressure. Examples of suitable amines and polyamines to functionalize the degraded PHA include, but are not limited to, primary amines, secondary amines and polyamines including a primary or a secondary amino-group, wherein the amine substituents include a saccharide, an oligosaccharide, a polysaccharide or an alkyl group. Representative, nonlimiting examples of such amines and polyamines include glucosamine, galactosamine, mannosamine, N-acetyl glucosamine, N-acetyl-galactosamine, N-acetyl-mannosamine, aminosorbitol, streptomycin, kanamycin, poly(glucosamine), poly(galactosamine), poly(ethylene imine), poly(vinyl amine) and similar amines and polyamines. The resulting amide-derivative of the degraded PHA first is purified by either size-exclusion or ion-exchange chromatography, dialysis, ultrafiltration, or other suitable purification methods. Then the functionalized PHA amide-derivative is isolated by lyophilization, spray-drying or precipitation. If an amine-derivative of PHA is desired, the above functionalizing reaction can be performed in the presence of a suitable reducing agent, such as sodium cyanoborohydride ($NaBH_3CN$), sodium borohydride ($NaBH_4$) or lithium aluminum hydride ($LiAlH_4$), or the isolated amide-derivative of the degraded PHA can be treated with a suitable reducing agent.

An ester-derivative of the degraded PHA can be prepared as described above by using a hydroxy compound, e.g. an alcohol, or a polyhydroxy compound, e.g. a polyol, in place of the amine or polyamine compound. Suitable hydroxy and polyhydroxy compounds include compounds having the general structural formula R-OH and R'—(R"—OH)$_n$—R', wherein R, R', or R" is a mono-, a di-, an oligo-, or a polysaccharide residue, or an alkyl group; or an equivalent acylated homolog of the saccharide. Examples of suitable hydroxy compounds and polyhydroxy compounds include, but are not limited to, glucose, galactose, mannose, lactose, maltose, sucrose, cyclodextrin, cellulose, starch, dextran, xanthan, cyclodextrin acetate, cellulose acetate, starch acetate, chitosan acetate, poly(vinyl alcohol), poly(vinyl acetate, arabinose, ribose, xylose, maltodextrins, chitooligosaccharides, cellooligosaccharides, glucal, rhamnose, fructose, fucose, glyceroglucoheptose, the alpha- and beta-alkyl or aryl glycosides of the above, in either the D- or L-series, and either acyclic or cyclic (pyranose or furanose) form, alginate, pectin, agarose, carrageenan, gellan, welan, rhamsan, hyaluronate, glycomannan, xylan, hemicellulosics, mannan, amylose, galactomannan, amylopectin, curdlan, pullulan, pustulan, scleroglucan, ribitol, glucitol, mannitol, galactitol, cellobiitol, maltitol, lactitol, and similar hydroxy-including compounds.

Similarly, if the degraded PHA is functionalized at the hydroxy-terminated end, examples of acids capable of interacting with the hydroxy terminal group include, but are not limited to, glucuronic acid, gluconic acid, glucaric acid, saccharic acid, glucosaminic acid, mannuronic acid, galacturonic acid, galactaric acid, glucoascorbic acid, ascorbic acid, glycero-glucoheptonic acid and similar acids, or the corresponding lactone derivatives of the acid. Furthermore, the hydroxy-terminated end can be functionalized with an alkenyl moiety having a molecular weight in the range of 25 to 100,000, such as, but not limited to, polyethylene, polypropylene, polybutadiene, polystyrene, polyisoprene, polyacrylic acid and its esters, polymethacrylic acid, polyvinylesters, polyxylene, polyvinyl chloride, polyamides, polyvinylacetals, polyvinylamine and similar substituted and unsubstituted polymer. It also is envisioned that the degraded PHA can be functionalized at both the hydroxy-terminated end and the carboxy-terminated end of the degraded PHA polyester with the same or different moieties.

The following Examples 1 through 10 illustrate representative functionalized poly(hydroxyalkanoate) derivatives of the present invention and their method of manufacture.

EXAMPLES 1-3

Polyhydroxybutyrate (PHB)-Chitosan Amide Derivatives (VIII)

A solution of degraded PHB having a molecular weight in the range of from about 425 daltons to about 500,000 daltons first was prepared by a partial acid hydrolysis of PHB, wherein 19 parts of PHB was dissolved in 255 parts of a mixture (1:50) of acetic acid/dimethylsulfoxide, and the resulting solution was stirred for about 16 hours at ambient temperature. Then, to a solution of 1 part of chitosan (VII) in 150 parts of an acetic acid (HOAc)/dimethylsulfoxide (DMSO) (1 part HOAc:14 parts DMSO) mixture, was added a mixture of the solution of partially-degraded PHB (Example 1: 1.2 parts; Example 2: 1.6 parts; Examples 3: 1.6 parts) in 150 parts of DMSO. Optionally, the partially-degraded PHB solution can be dispersed in 150 parts of a mixture of methylene chloride/DMSO (1:1.5). The reaction mixture including the degraded PHA and the chitosan was stirred for 1, 2 or 5 days (Examples 1, 2 and 3, respectively) at ambient temperature, then the reaction mixture was dialyzed against water for several days to separate the unfunctionalized PHA from the chitosan-functionalized PHA (VIII). The chitosan-functionalized PHA compound (VIII) then was precipitated from the reaction mixture with acetone (EXS. 1 and 2) or was lyophilized (EX. 3). Yields in weight percent were, for Example 1: 1.6 parts (72%); Example 2: 2.6 parts (100%); and Example 3: 2.5 parts (95%). Elemental analysis of the reaction products (VIII) gave: Example 1: C 46.45%, H 6.85%, N 3.41%; Examples 2: C 41.31%, H 6.32%, N 2.93%, and Example 3: C 38.49%, H 6.14%, N 3.14%. These elemental analysis indicate a relatively small degree of chitosan substitution (degree of substitution [d.s.]=ca. 0.02-0.03) on a degraded PHB having a $M_w$ of about 10,000 daltons.

amples 1-3 demonstrated both hydrophilic and lipophilic properties. Furthermore, the chitosan functionality improved the thermal stability of the PHA, thereby making the polymer easier to process and more practical to utilize in manufacturing a commercially-useful, biodegradable plastic. An example of a commercially-useful plastic is one capable of manufacture into a film or sheet that is applied to the ground to act as a barrier against the growth of weeds. The film prohibits weed growth where applied, then biodegrades due to soil microorganisms within a relatively short time period of one to five years to environmentally-acceptable carbon dioxide and water.

Accordingly, a method of preparing an easy-to-process, water-soluble and biodegradable functionalized poly(hydroxyalkanoate) derivative has been demonstrated. Furthermore, by altering the reaction conditions, such as increasing the temperature or increasing the amount of degraded PHA in the reaction mixture, it is envisioned that the degree of substitution (d.s.) can be increased up to at least about 15% (d.s.=0.15), and up to about 90%, to provide functionalized PHA derivatives having a wide variety of physical properties. In addition, it should be noted that the PHA derivative (VIII) still has an unmodified hydroxy moiety present at a terminal end of the PHA portion of the compound. This hydroxy moiety also can be functionalized to further provide a difunctionalized poly(hydroxyalkanoate) derivative having the desired physical properties for a particular end-use, such as increased heat stability, rate of biodegradation, melting point, softening point, film strength, film elasticity and similar physical properties.

EXAMPLE 4

PHB-Cellulose Acetate Ester Derivatives (X)

To a solution of cellulose triacetate (IX) (1 part) in DMSO (150 parts) was added a solution of partially-

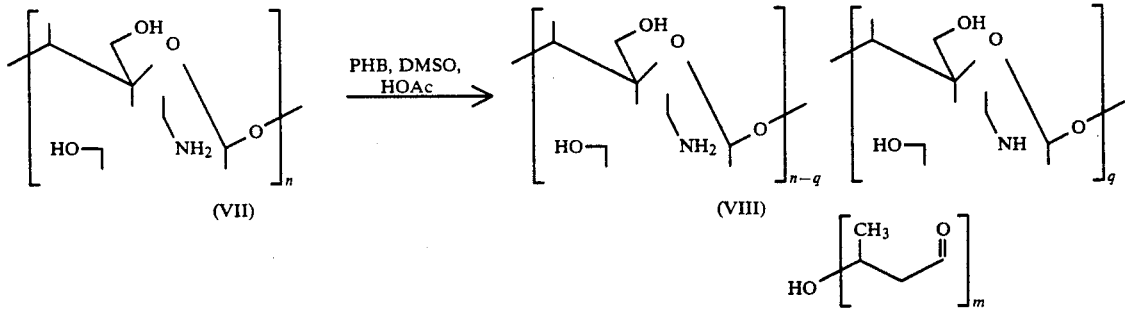

d.s. 0.03;  m = ca. 70

The polyhydroxybutyrate-chitosan derivative (VIII) demonstrated unique solubility features in comparison to the starting materials, PHA and chitosan. It was observed that whereas neither the parent, degraded PHB nor the chitosan is water soluble, the PHB-chitosan derivatives of EXS. 1-3 formed opaque, viscous solutions in water. Upon drying, these aqueous solutions provided strong, elastic films. In addition, the functionalized PHA derivatives (VIII) prepared in Exhydrolyzed PHB (obtained as described in Examples 1-3, 4.1 parts) in 45 parts of an acetic acid/DMSO (1:14) mixture. The resulting reaction mixture was stirred at ambient temperature for 4 days, dialyzed, and the functionalized PHA derivative (X) was precipitated with acetone to yield 1.2 parts of PHA derivative (X) as a white solid. The material was characterized by IR (infrared) spectroscopy, and demonstrated film-forming properties.

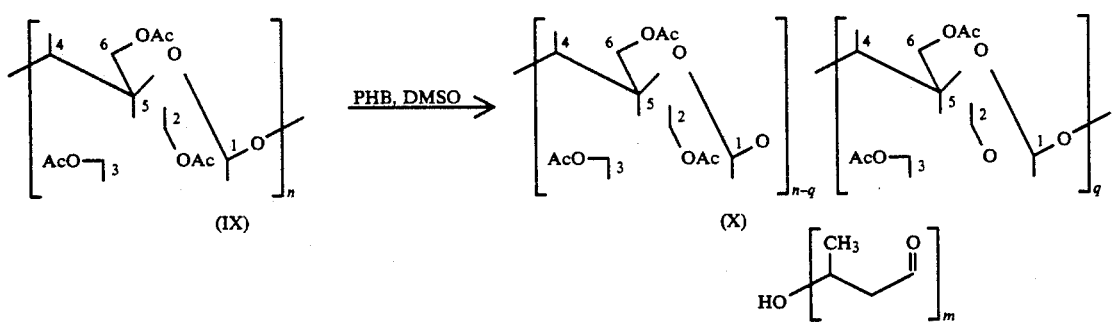

(IX)    (X)

EXAMPLES 5 AND 6

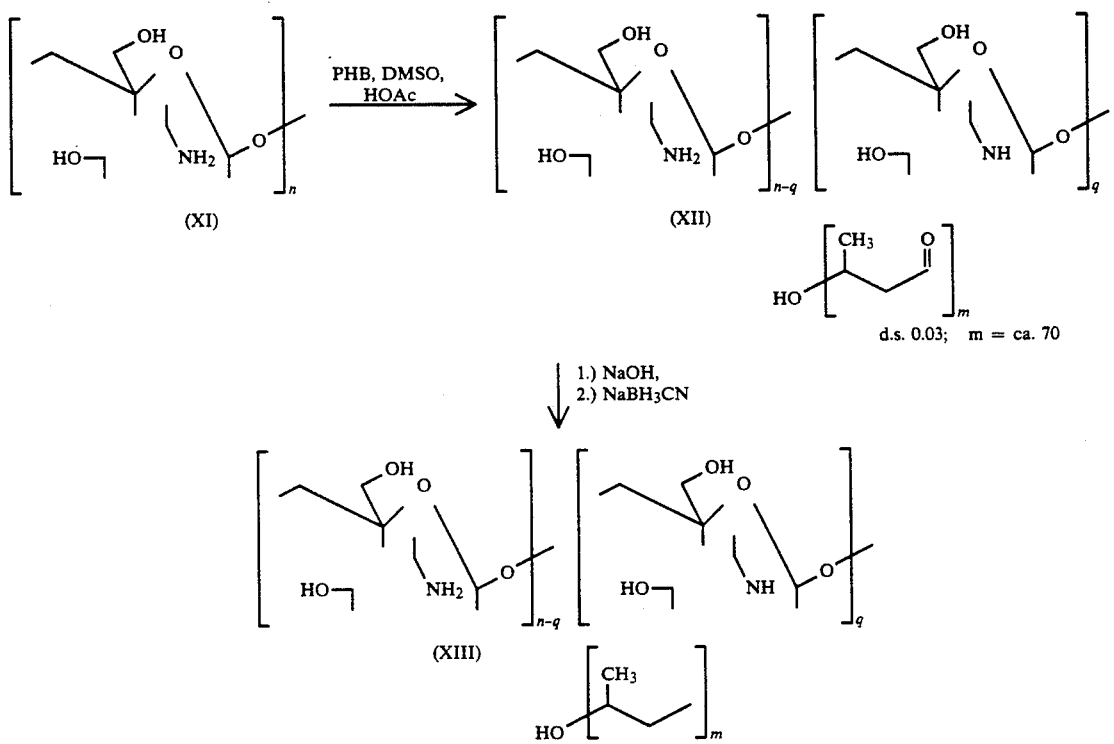

(XI)    (XII)

d.s. 0.03;  m = ca. 70

(XIII)

neously functionalized, in situ, to provide functionalized PHA derivatives of the present invention.

PHB-Poly(galactosamine) Amide (XII) and Amine (XIII) Derivatives

To a solution of non-degraded PHB (3.4 parts) in DMSO (120 parts) was added a solution of poly(galactosamine) (XI) (1 part) in acetic acid/DMSO (1:63, 260 parts) The resulting reaction mixture was stirred at ambient temperature for 2 days, dialyzed against water, and then lyophilized (Example 5, (XII)). Alternatively, the above reaction mixture, after stirring for 1 day at ambient temperature, was neutralized with 1N sodium hydroxide (NaOH) and then treated with sodium cyanoborohydride (NaBH$_3$CN) (28 parts) (Example 6, (XIII)). Elemental analysis for the reaction products (XII) and (XIII) gave: Example 5 (XII): C 49.74%; H 6.64%; N 1.47%; and Example 6 (XIII): C 48.23%; H 6.92%; N 2.10%. The functionalized PHA derivatives (XII) and (XIII) each demonstrated film-forming properties. The functionalized PHA of Example 5 (XII) demonstrated a degree of substitution of about 3%. In Examples 5 and 6, the PHB was degraded and simultaneously functionalized, in situ, to provide functionalized PHA derivatives of the present invention.

EXAMPLE 7

PHB-Glucamine Amide Derivative (XV)

A solution of non-degraded PHB (2.07 parts) in acetic acid/DMSO (1:25, 80 parts) was added to a solution including 1-amino-1-deoxy-sorbitol (XIV) (1 part) in DMSO (60 parts). After stirring the resulting reaction mixture at ambient temperature for 3 days, the reaction mixture was dialyzed, then lyophilized, yielding 2.73 parts of functionalized PHA derivative (XV) as a white solid material having an elemental analysis C 43.33%, H 6.18%, and N 0.46%.

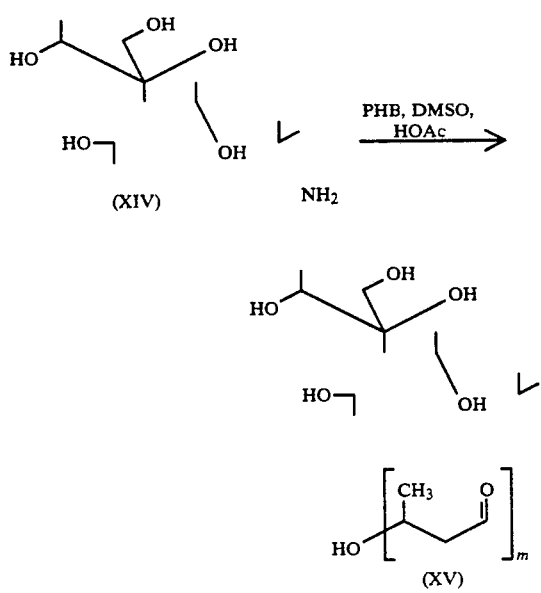

EXAMPLES 8-10

PHB-Poly(ethyleneimine) Amide Derivatives (XVII)

A solution of poly(ethyleneimine) (PEI) (XVI) (Example 8: PEI $M_w$ 1,800 d (daltons), 1 part; Example 9: PEI $M_w$ 10,000 d, 1 part; Example 10: PEI $M_w$ 70,000 d, 1 part) in DMSO (150 parts) was added to a solution of partially-degraded PHB, obtained as described in Examples 1-3, (Example 8: 1.10 parts; Example 9: 0.76 parts; Example 10: 0.92 parts) in acetic acid/DMSO (45 parts). In each Example, the resulting reaction mixture was a white suspension. In Examples 8-10, the white suspension was stirred at ambient temperature for 3 days, then dialyzed, and finally lyophilized, yielding 1.14 parts (EX. 8), 0.6 parts (EX. 9), and 1.0 parts (EX. 10), respectively, of a polyethyleneimine-functionalized PHA derivative (XVII) as a white solid. Elemental analysis of the reaction products (XVII) gave: Example 8: C 49.07%, H 7.50%, N 6.92%; Example 9: C 4.23%, H 8.77%, N 13.87%; Example 10: C 50.28%, H 7.28%, N 4.90%. Each polyethyleneimine-functionalized derivative (XVII) demonstrated film-forming properties.

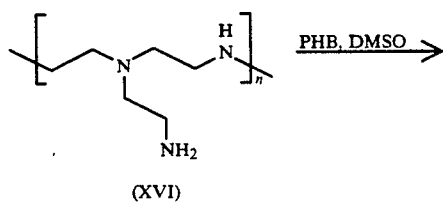

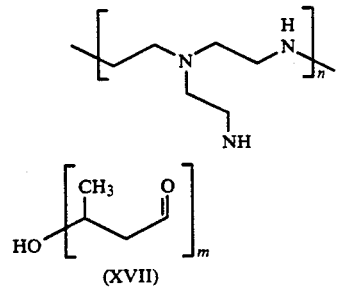

The above Examples demonstrate that a functionalized poly(hydroxyalkanoate) derivative of the present invention is a stable and easy-to-process polymeric compound that can be designed to possess physical properties suitable for a variety of commercial applications. In addition, the functionalized PHA derivative can include a moiety capable of undergoing further chemical modification to further improve or modify the physical properties of the functionalized PHA derivative. The PHA derivatives of the present invention include a biodegradable PHA that is functionalized with a biodegradable or a non-biodegradable moiety other than a PHA, thereby providing an environmentally acceptable product. Furthermore, the degraded PHA can be functionalized at either, or at both, terminal groups to provide a compound having the desired physical properties for a particular end use application.

Obviously, many modifications and variations of the invention as hereinbefore set forth can be made without departing from the spirit and scope thereof and therefore only such limitations should be imposed as are indicated by the appended claims.

I claim:

1. A functionalized poly(hydroxyalkanoate) compound having the formula:

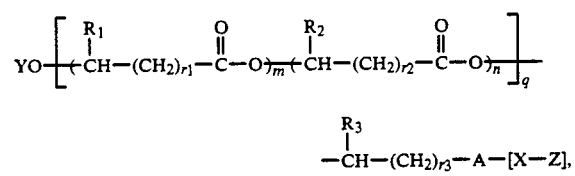

wherein Y is hydrogen or an alkenyl moiety having a molecular weight in the range of from about 25 to about 100,000; $R_1$, $R_2$ and $R_3$ are, independently, hydrogen, an aromatic moiety, an alkyl moiety or an alkenyl moiety, said alkyl moiety or said alkenyl moiety including from one to about nine carbon atoms; A is carbonyl or methylene; X is oxygen or NH; Z is selected from the group consisting of hydrogen, an alkyl moiety, or an alkenyl moiety having a molecular weight in the range of from about 25 to about 100,000, with the provision that if Y is hydrogen, Z is not hydrogen; $r_1$, $r_2$, $r_3$ are, independently, a numeral 1, 2 or 3; m and n are, independently, a numeral in the range of from one to about 5; and q is a numeral in the range of from about 5 to about 10,000.

2. The poly(hydroxyalkanoate) compound of claim 1 wherein q is a numeral in the range of from about 10 to about 150.

3. The poly(hydroxyalkanoate) compound of claim 1 wherein Y is hydrogen and Z is an alkenyl moiety having a molecular weight in the range of from about 25 to about 100,000.

4. The poly(hydroxyalkanoate) compound of claim 1 wherein Z is hydrogen and Y is selected from the group consisting of a polyethylene, a polypropylene, a polybutadiene, a polystyrene, a polyisoprene, a polyacrylic acid, a polyester, a polymethacrylic acid, a polyvinylester, a polyxylene, a polyvinyl chloride, a polyamide, a polyvinylacetal and a polyvinylamine.

5. The poly(hydroxyalkanoate) compound of claim 1 wherein $R_1$, $R_2$ and $R_3$ are methyl moieties or ethyl moieties and wherein $r_1$, $r_2$ and $r_3$ are the numeral 1 or 2.

6. The poly(hydroxyalkanoate) compound of claim 1 wherein $R_1$, $R_2$, or $R_3$ is an alkenyl moiety, and the alkenyl moiety has been interacted with a compound selected from the group consisting of an alkene, vinyl chloride, vinylidine chloride, an acrylate, a methacrylate, acrylonitrile, vinyl acetate, styrene, acrylamide, maleic anhydride, acrylate acid, methacrylic acid and combinations thereof.

7. A method of manufacturing a functionalized poly(hydroxyalkanoate) compound having the formula:

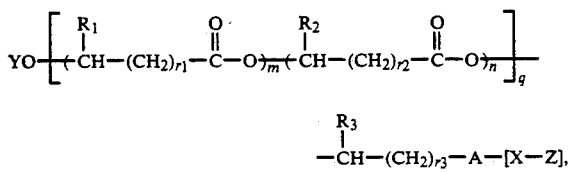

wherein Y is hydrogen, a saccharide moiety or an alkenyl moiety having a molecular weight in the range of from about 25 to about 100,000; $R_1$, $R_2$ and $R_3$ are, independently, hydrogen, an aromatic moiety, an alkyl moiety or an alkenyl moiety, said alkyl moiety or said alkenyl moiety including from one to about nine carbon atoms; A is carbonyl or methylene; X is oxygen or NH; Z is selected from the group consisting of hydrogen, a saccharide moiety, an alkyl moiety and an alkenyl moiety having a molecular weight in the range of from about 25 to about 100,000, with the provision that if Y is hydrogen, Z is not hydrogen; $r_1$, $r_2$ and $r_3$ are, independently, a numeral 1, 2 or 3; m and n are, independently, a numeral in the range of from one to about 5; and q is a numeral in the range of from about 5 to about 10,000, comprising:

forming a reaction mixture comprising a poly(hydroxyalkanoate) and a functionalizing compound capable of interacting with the terminal carboxygroup or the terminal hydroxy group of the poly(hydroxyalkanoate), said reaction mixture having a suitable pH for an interaction between the poly(hydroxyalkanoate) and the functionalizing compound; and maintaining the reaction mixture at a sufficient temperature and for a sufficient time to partially depolymerize the poly(hydroxyalkanoate) to a degraded poly(hydroxyalkanoate) and to allow the functionalizing compound to interact with the poly(hydroxyalkanoate) to form the functionalized poly(hydroxyalkanoate) compound.

8. The method of claim 7 wherein the functionalizing compound is selected from the group consisting of a primary amine, a secondary amine, a polyamine, an alcohol, a polyol, and acylated polyol, a carboxylic acid and combinations thereof.

9. The method of claim 7 wherein the functionalizing compound is selected from the group consisting of a monosaccharide, a disaccharide, an oligosaccharide, a polysaccharide and combinations thereof.

10. The method of claim 7 wherein the functionalizing compound is an alkenyl compound including at least one unsaturated carbon-carbon linkage and having a molecular weight in the range of from about 25 to about 10,000.

11. The method of claim 7 wherein the suitable pH is less than about 6 or greater than about 8.

12. The method of claim 7 wherein the mixture is maintained at a temperature in the range of from about 20° C. to about 150° C. for a time period of from about 2 hours to about 200 hours.

13. The method of claim 7 wherein the poly(hydroxyalkanoate) and the functionalizing compound are present in the reaction mixture in a molar equivalent ratio of poly(hydroxyalkanoate) to functionalizing compound in the range of from about 0.1 to 1 to about 10 to 1.

14. The method of claim 7 wherein the degraded poly(hydroxyalkanoate) has a molecular weight in the range of from about 425 daltons to about 500,000 daltons.

15. The method of claim 7 wherein the degraded poly(hydroxyalkanoate) has a molecular weight in the range of from about 1000 daltons to about 75,000 daltons.

16. The method of claim 7 further comprising interacting the functionalized poly(hydroxyalkanoate) with a reducing agent to provide a reduced form of the functionalized poly(hydroxyalkanoate).

17. The method of claim 16 wherein the reducing agent is selected from the group consisting of sodium cyanoborohydride, sodium borohydride and lithium aluminum hydride.

18. A method of manufacturing a poly(hydroxyalkanoate) compound having the formula:

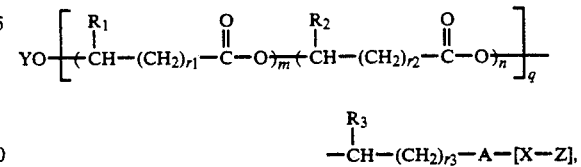

wherein Y is hydrogen, a saccharide moiety or an alkenyl moiety having a molecular weight in the range of from about 25 to about 100,000; $R_1$, $R_2$ and $R_3$ are, independently, hydrogen, an aromatic moiety, an alkyl moiety or an alkenyl moiety, said alkyl moiety or said alkenyl moiety including from one to about nine carbon atoms; A is carbonyl or methylene; X is oxygen or NH; Z is selected from the group consisting of hydrogen, a saccharide moiety, an alkyl moiety and an alkenyl moiety having a molecular weight in the range of from about 25 to about 100,000, with the provision that if Y is hydrogen, Z is not hydrogen; $r_1$, $r_2$ and $r_3$ are, independently, a numeral 1, 2 or 3; m and n are, independently, a numeral in the range of from one to about 5; and q is a numeral in the range of from about 5 to about 10,000, comprising:

forming a poly(hydroxyalkanoate) solution by dispersing the poly(hydroxyalkanoate) in a solvent having a pH below about 6 or above about 8;

maintaining the poly(hydroxyalkanoate) solution at a sufficient temperature for a sufficient time to partially hydrolyze the poly(hydroxyalkanoate) and to provide a degraded poly(hydroxyalkanoate); and interacting the degraded poly(hydroxyalkanoate) with a functionalizing compound to provide a functionalized poly(hydroxyalkanoate).

19. A method of manufacturing a poly(hydroxyalkanoate) compound having the formula:

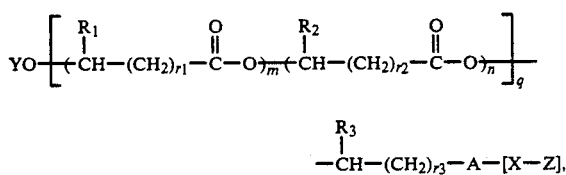

$$-\underset{R_3}{\overset{|}{CH}}-(CH_2)_{r_3}-A-[X-Z],$$

wherein Y is hydrogen, a saccharide moiety or an alkenyl moiety having a molecular weight in the range of from about 25 to about 100,000; $R_1$, $R_2$ and $R_3$ are, independently, hydrogen, an aromatic moiety, an alkyl moiety or an alkenyl moiety, said alkyl moiety or said alkenyl moiety including from one to about nine carbon atoms; A is carbonyl or methylene; X is oxygen or NH; Z is selected from the group consisting of hydrogen, a saccharide moiety, an alkyl moiety and an alkenyl moiety, said alkenyl moiety having a molecular weight in the range of from about 25 to about 100,000, with the provision that if Y is hydrogen, Z is not hydrogen; $r_1$, $r_2$ and $r_3$ are, independently, a numeral 1, 2 or 3; m and n are, independently, a numeral in the range of from one to about 5; and q is a numeral in the range of from about 5 to about 10,000, comprising:

forming a reaction mixture comprising a poly(hydroxyalkanoate) and a functionalizing compound, said functionalizing compound capable of interacting with a terminal carboxy-group or a terminal hydroxy-group of the poly(hydroxyalkanoate);

maintaining the reaction mixture at a sufficient temperature for a sufficient time to allow the functionalizing compound and the poly(hydroxyalkanoate) to interact and form a high molecular weight functionalized poly(hydroxyalkanoate);

adjusting the pH of the reaction mixture to a level sufficient to hydrolyze the high molecular weight functionalized poly(hydroxyalkanoate); and maintaining the pH adjusted reaction mixture for a sufficient time and at a sufficient temperature to provide a functionalized poly(hydroxyalkanoate) having a molecular weight in the range of from about 425 daltons to about 500,000 daltons.

20. A method of manufacturing a poly(hydroxyalkanoate) compound having the formula:

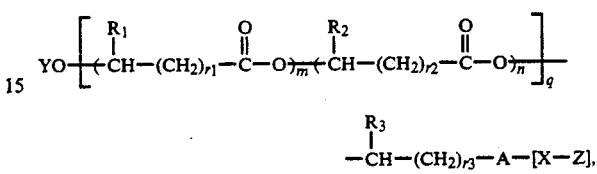

$$-\underset{R_3}{\overset{|}{CH}}-(CH_2)_{r_3}-A-[X-Z],$$

wherein Y is hydrogen, a saccharide moiety or an alkenyl moiety having a molecular weight in the range of from about 25 to about 100,000; $R_1$, $R_2$ and $R_3$ are, independently, hydrogen, an aromatic moiety, an alkyl moiety or an alkenyl moiety including from one to about nine carbon atoms; A is carbonyl or methylene; X is oxygen or NH; Z is selected from the group consisting of hydrogen, a saccharide moiety, an alkyl moiety and an alkenyl moiety, said alkenyl moiety having a molecular weight in the range of from about 25 to about 100,000, with the provision that if Y is hydrogen, Z is not hydrogen; $r_1$, $r_2$ and $r_3$ are, independently, a numeral 1, 2 or 3; m and n are, independently, a numeral in the range of from one to about 5; and q is a numeral in the range of from about 5 to about 10,000, comprising:

forming a poly(hydroxyalkanoate) solution by dispersing the poly(hydroxyalkanoate) in a suitable solvent;

heating the poly(hydroxyalkanoate) solution for a sufficient time at a sufficient temperature to provide a degraded poly(hydroxyalkanoate) having a molecular weight in the range of from about 425 daltons to about 500,000 daltons; and interacting the degraded poly(hydroxyalkanoate) with a functionalizing compound to provide the functionalized poly(hydroxyalkanoate).

21. The method of claim 18 wherein the poly(hydroxyalkanoate) solution is heated at a temperature in the range of from about 50° C. to about 150° C. for a time period in the range of from about 2 hours to about 200 hours.

* * * * *

UNITED STATES PATENT AND TRADEMARK OFFICE
CERTIFICATE OF CORRECTION

PATENT NO. : 5,268,422
DATED : December 7, 1993
INVENTOR(S) : Yalpani

It is certified that error appears in the above-indentified patent and that said Letters Patent is hereby corrected as shown below:

Item [54], cover page, "METHODS" should be --METHOD--.

Col. 3, line 61, "co-8-hydrox..." should be --co-β-hydrox...--.

Col. 3, line 64, "Macromolecules" should be italicized.

Cols. 11, 12, lines 38-59, delete formulas (VII) and (VIII) and insert new formulas (VII) and (VIII) therefor.

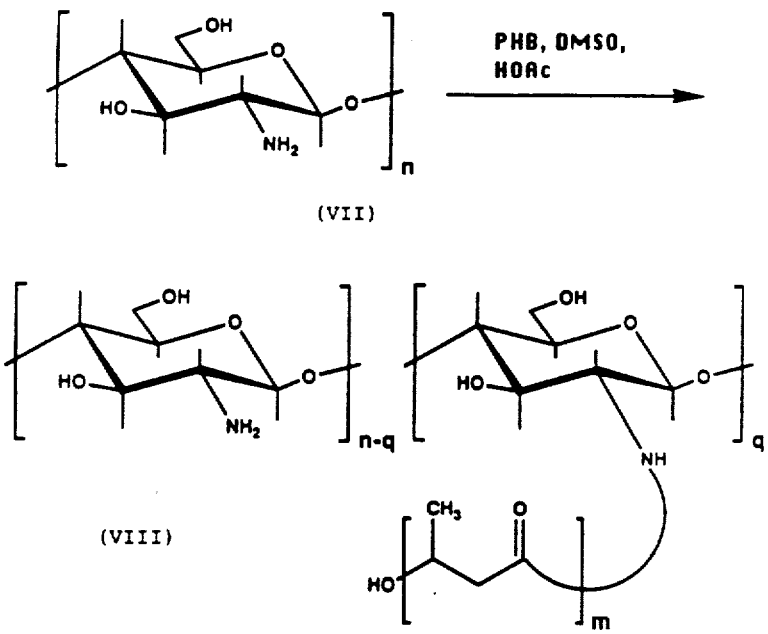

d.s. 0.03; m = ca. 70

UNITED STATES PATENT AND TRADEMARK OFFICE
CERTIFICATE OF CORRECTION

PATENT NO. : 5,268,422
DATED : December 7, 1993
INVENTOR(S) : Yalpani

It is certified that error appears in the above-indentified patent and that said Letters Patent is hereby corrected as shown below:

Cols. 13-14, l. 1-14, delete formulas (IX) and (X) and insert new formulas (IX) and (X) therefor.

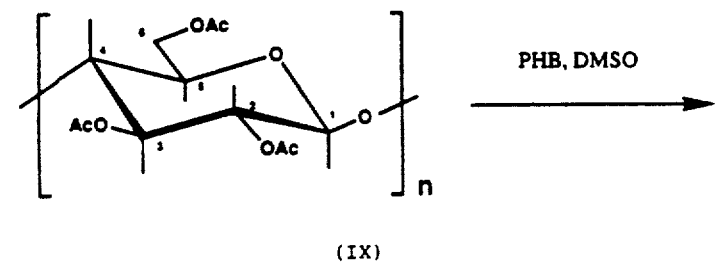

(IX)

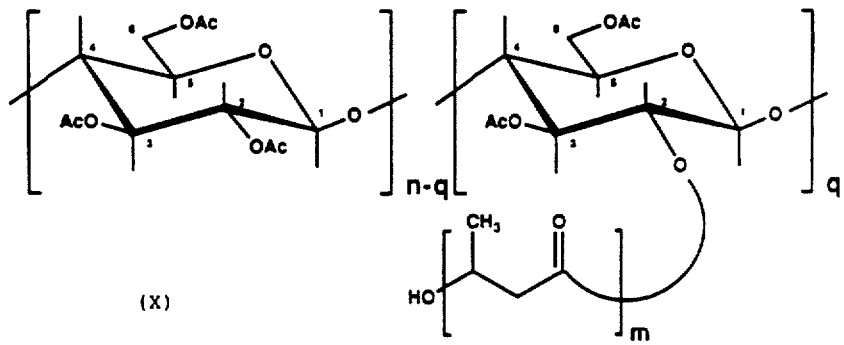

(X)

UNITED STATES PATENT AND TRADEMARK OFFICE
CERTIFICATE OF CORRECTION

PATENT NO. : 5,268,422
DATED : December 7, 1993
INVENTOR(S) : Yalpani

It is certified that error appears in the above-indentified patent and that said Letters Patent is hereby corrected as shown below:

Cols. 13-14, 1. 16-31, delete formulas (XI) and (XII) and insert new formulas (XI) and (XII) therefor.

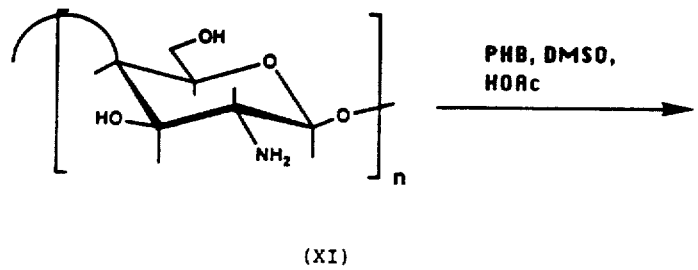

(XI)

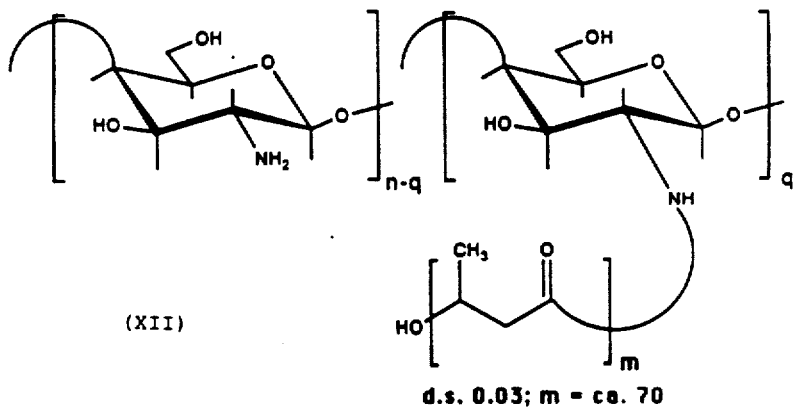

(XII)

d.s. 0.03; m = ca. 70

UNITED STATES PATENT AND TRADEMARK OFFICE
CERTIFICATE OF CORRECTION

PATENT NO. : 5,268,422

DATED : December 7, 1993

INVENTOR(S) : Yalpani

It is certified that error appears in the above-indentified patent and that said Letters Patent is hereby corrected as shown below:

Cols. 13-14, 1. 32-46, delete formula (XIII) and insert formula (XIII) therefor.

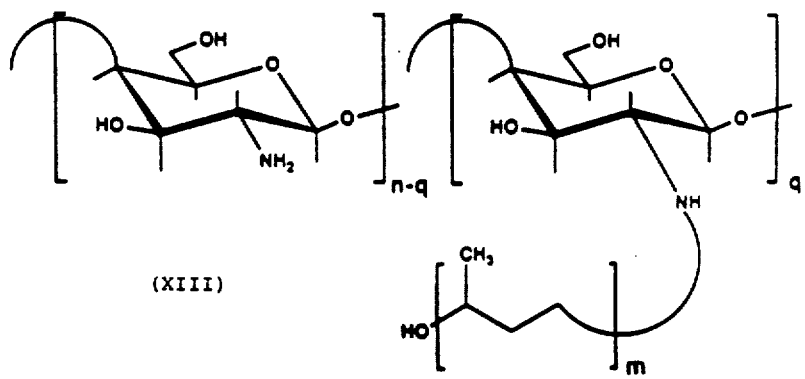

(XIII)

Col. 13, 1. 54, "parts) The" should be --parts). The--.

UNITED STATES PATENT AND TRADEMARK OFFICE
CERTIFICATE OF CORRECTION

PATENT NO. : 5,268,422
DATED : December 7, 1993
INVENTOR(S) : Yalpani

It is certified that error appears in the above-indentified patent and that said Letters Patent is hereby corrected as shown below:

Col. 15, l. 1-27, delete formulas (XIV) and (XV) and insert new formulas (XIV) and (XV) therefor.

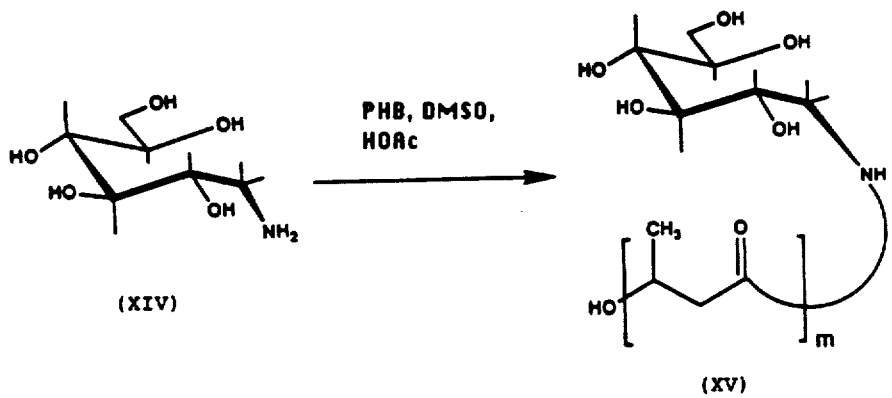

Col. 15, l. 53, "C 4.23%" should be --C 44.23%--.

UNITED STATES PATENT AND TRADEMARK OFFICE
CERTIFICATE OF CORRECTION

PATENT NO. : 5,268,422
DATED : December 7, 1993
INVENTOR(S) : Yalpani

It is certified that error appears in the above-indentified patent and that said Letters Patent is hereby corrected as shown below:

Col. 16, l. 1-13, delete formulas (XVI) and (XVII) and insert new formulas (XVI) and (XVII) therefor.

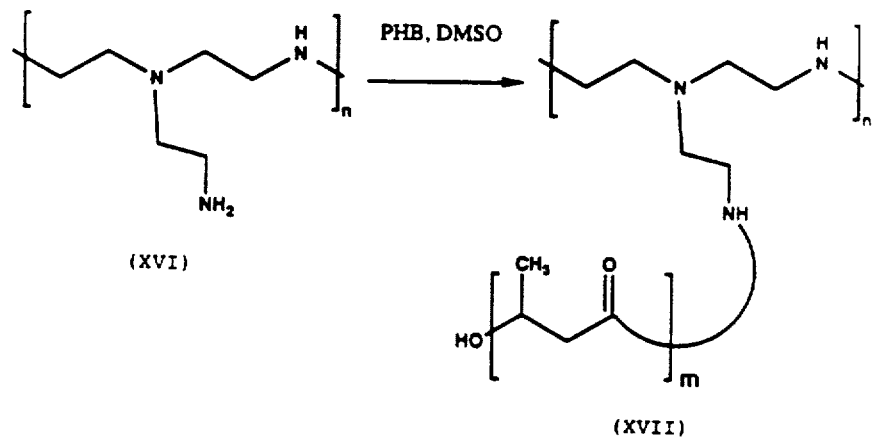

(XVI)  (XVII)

Signed and Sealed this

Twenty-sixth Day of July, 1994

Attest:

BRUCE LEHMAN

Attesting Officer    Commissioner of Patents and Trademarks